(12) United States Patent
Sadahiro et al.

(10) Patent No.: US 6,407,664 B1
(45) Date of Patent: Jun. 18, 2002

(54) SYSTEM AND METHOD FOR MONITORING VEHICLE

(75) Inventors: Takashi Sadahiro; Masahiro Shimizu; Michiyasu Nounen; Mikio Araki; Yusuke Hara; Shigeki Nakane, all of Tokyo (JP)

(73) Assignees: Mitsubishi Jidosha Kogyo Kabushiki Kaisha; Mitsubishi Denki Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/402,356

(22) PCT Filed: May 29, 1998

(86) PCT No.: PCT/JP98/02393

§ 371 (c)(1),
(2), (4) Date: Oct. 4, 1999

(87) PCT Pub. No.: WO99/63319

PCT Pub. Date: Dec. 9, 1999

(51) Int. Cl.[7] .................................................. G08B 1/00
(52) U.S. Cl. ...................... 340/531; 340/533; 340/538; 73/117.3; 73/701
(58) Field of Search ........................... 340/531, 533, 340/538; 73/117.3, 701, 118.1, 119 A

(56) References Cited

U.S. PATENT DOCUMENTS

| | | | |
|---|---|---|---|
| 4,748,843 A | * 6/1988 | Shafer et al. | 73/117.3 |
| 5,034,727 A | 7/1991 | Muraoka | 340/652 |
| 5,321,689 A | 6/1994 | Suzuki et al. | 370/228 |
| 5,563,788 A | 10/1996 | Yoon | 701/31 |
| 5,750,886 A | 5/1998 | Lambert et al. | 73/117 |

FOREIGN PATENT DOCUMENTS

| | | |
|---|---|---|
| EP | 0 631 213 A2 | 12/1994 |
| JP | 60-11175 | 1/1985 |
| JP | 61-164552 | 10/1986 |
| JP | 62-128851 | 6/1987 |
| JP | 4-198734 | 7/1992 |
| JP | 7-59177 | 3/1995 |

\* cited by examiner

*Primary Examiner*—Daryl Pope
(74) *Attorney, Agent, or Firm*—Sughrue Mion, PLLC

(57) ABSTRACT

Determination is made as to whether or not a self-diagnostic tester 13 is connected with a K line 14. When the result of the determination indicates that the self-diagnostic tester 13 is not connected with the K line 14, data indicating vehicle-operating conditions are obtained from an engine ECU 11 and the like through a K line 14.

8 Claims, 4 Drawing Sheets

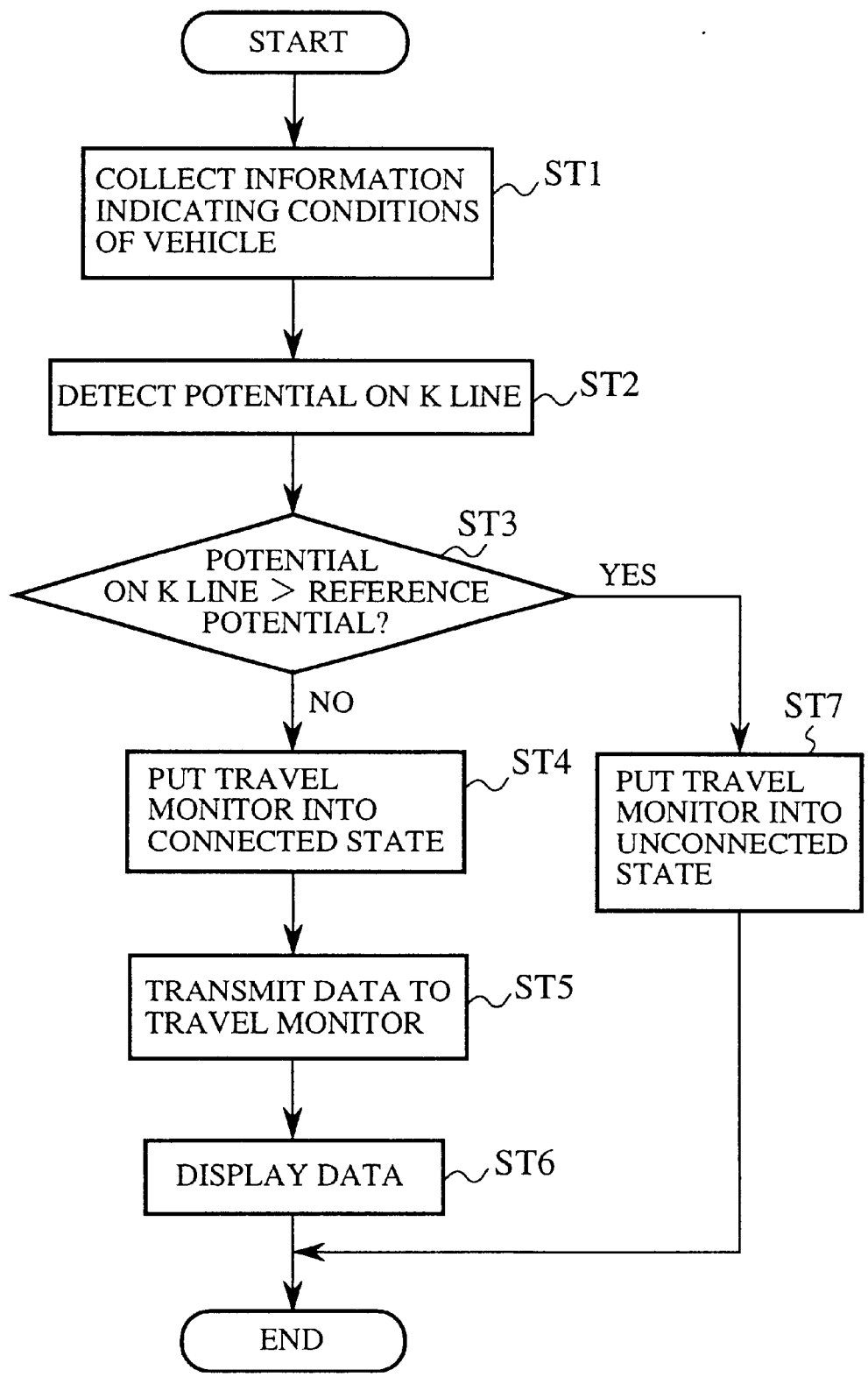

SYSTEM AND METHOD FOR MONITORING VEHICLE

RELATED APPLICATIONS

This application claims priority to international application PCT/JP98/02393 having a filing date of May 29, 1998.

1. Technical Field

The present invention relates to a vehicle monitor and a vehicle monitor method for displaying vehicle data.

2. Background Art

FIG. 1 is a block diagram of a prior art vehicle monitor. Referring to the drawing, reference numerals 1 and 2 denote ECUs which control the engine, ABS apparatus, and the like, measure data indicating vehicle-operating conditions (such as fuel consumption, engine speed etc.), and transmit data upon receipt of data transfer requests from an operation monitor 3. Reference numeral 3 denotes the operation monitor which transmits data transfer requests to the ECUs 1 and 2, and displays received data, and reference numeral 4 denotes a communication line connecting the operation monitor 3 with the ECUs 1 and 2.

The operation of the present invention will be described below.

Firstly, in order to realize operating conditions corresponding to accelerating and braking operations, the ECUs 1 and 2 control the engine, the ABS apparatus, and the like and at the same time measure fuel consumption, engine speed and so on.

On the other hand, in order to enable the driver of the vehicle to confirm the vehicle-operating conditions, the operation monitor 3 transmits data transfer requests for data indicating vehicle-operating conditions to the ECUs 1 and 2 through the communication line 4.

When data are sent thereto from the ECUs 1 and 2 in compliance with the data transfer request through the communication line 4, the operation monitor 3 takes up the data from the communication line 4 and displays such data, for example, on an indicator in the vehicle.

Thus although the driver of the vehicle can infer the vehicle-operating conditions, as is apparent from FIG. 1, it is necessary to provide a designated communication line 4 to connect the operation monitor 3 with the ECUs 1 and 2 for data transmission in the vehicle.

Further, the ECUs 1 and 2 are connected, not only with the operation monitor 3, but also with a self-diagnostic tester 5. (As shown in FIG. 2, the self-diagnostic tester 5 is a self-diagnostic tester connected by a connector 7 when the vehicle is inspected. The self-diagnostic tester 5 detects an abnormality or the like in the vehicle upon receipt of data from the ECUs 1 and 2). The ECUs are connected with the self-diagnostic tester 5 through a K line 6 and a connector 7 wherein the K line 6 is a communication line which is not normally used while the self-diagnostic tester 5 is unconnected.

Furthermore the K line 6 is a communication line in conformity with ISO 9141.

Since the prior art vehicle monitor is constructed as described above, the operation monitor 3 receives and displays data from the ECUs 1 and 2. However the problem has arisen that, in order for the operation monitor 3 to be able to obtain data from the ECUs 1 and 2, it is necessary not only to provide an operation monitor 3 in the vehicle, but also to provide a designated communication line 4 in the vehicle to connect the operation monitor 3 with the ECUs 1 and 2.

The present invention is proposed to solve the above mentioned problem and it is an object of the invention to obtain a vehicle monitor and a vehicle monitor method capable of displaying data indicating vehicle-operating conditions without providing a designated communication line in the vehicle.

DISCLOSURE OF INVENTION

The vehicle monitor of the present invention comprises a determination means which determines whether or not a self-diagnostic tester is connected to a communication line and which, when the result of the determination made by the determination means indicates that there is no connection, obtains data indicating vehicle-operating conditions from a collection means through a communication line and displays the data.

Thereby, it is possible to obtain data indicating vehicle-operating conditions by the use of an existing communication line to which the self-diagnostic tester is to be connected and, as a result, the effect is obtained that data indicating vehicle-operating conditions can be displayed without the need for a designated communication line in the vehicle.

The vehicle monitor of the present invention is adapted to use a K line as a communication line.

Thereby, the effect is obtained that data indicating vehicle-operating conditions can be obtained by using the K line when the self-diagnostic tester is unconnected, without the need for a designated communication line.

The vehicle monitor of the present invention is adapted to compare the potential on the communication line with a reference potential and thereby to determine whether or not there is a connection.

Thereby, the effect is obtained that the determination as to whether the connection is made or not is achieved without providing a complicated determination circuit.

The vehicle monitor of the present invention is adapted to disconnect a display means from the communication line when the self-diagnostic tester is connected with the communication line, and, when the self-diagnostic tester is not connected, to connect the display means to the communication line.

Thereby, the effect is obtained that processing of the self-diagnostic tester can be prevented from being disturbed when the self-diagnostic tester is connected, while data indicating vehicle-operating conditions can be obtained when the self-diagnostic tester is unconnected.

The monitor apparatus of the present invention is adapted to diagnose the vehicle-operating conditions on the basis of data indicating such conditions and to display the results of the diagnosis.

Thereby, the effect is obtained that the driver of the vehicle can confirm vehicle-operating conditions without the necessity of inferring operating conditions from data indicating such conditions.

In the vehicle monitor method of the present invention, a determination is made as to whether or not a self-diagnostic tester is in connection with a communication line. Data indicating vehicle-operating conditions are obtained from the communication line and is presented when the result of the determination indicates that the self-diagnostic tester is not connected with said communication line.

Thereby, the effect can be obtained that when the self-diagnostic tester is unconnected, data indicating vehicle-operating conditions can be obtained by using a K line without the need for a designated communication line.

The vehicle monitor method of the present invention is adapted to use the K line as a communication line.

Thereby, the effect is obtained that when the self-diagnostic tester is unconnected, data indicating vehicle-operating conditions can be obtained by using the K line without the need for a designated communication line.

The vehicle monitor method of the present invention is adapted to compare the potential on the communication line with a reference potential and to determine whether a connection is made or not on the basis of the result of the comparison.

Thereby, the effect is obtained that a determination as to whether or not the connection is made can be achieved without the need for providing a complicated determination circuit.

The vehicle monitor method of the present invention is adapted to disconnect the operation monitor presenting the data from the communication line when the self-diagnostic tester is connected with the communication line, and, when the self-diagnostic tester is not connected, to put the operation monitor into connection with the communication line.

Thereby, the effect is obtained, while data indicating vehicle-operating conditions can be obtained when the self-diagnostic tester is not in connection, processing of the self-diagnostic tester can be prevented from being disturbed when the self-diagnostic tester is in connection.

The vehicle monitor method of the present invention is adapted to diagnose vehicle-operating conditions on the basis of data indicating vehicle-operating conditions to display the results of the diagnosis.

Thereby, the effect is obtained that the driver of the vehicle can confirm vehicle-operating conditions without the necessity to infer such operating conditions from data indicating vehicle-operating conditions.

BRIEF DESCRIPTION OF DRAWINGS

FIG. 5 is a flowchart showing the vehicle monitor method according to the first embodiment of the invention.

BEST MODE FOR CARRYING OUT THE INVENTION

To describe the invention in more detail, the best mode for carrying out the invention will be described below with reference to the accompanying drawings.

Embodiment 1

Figure 1:
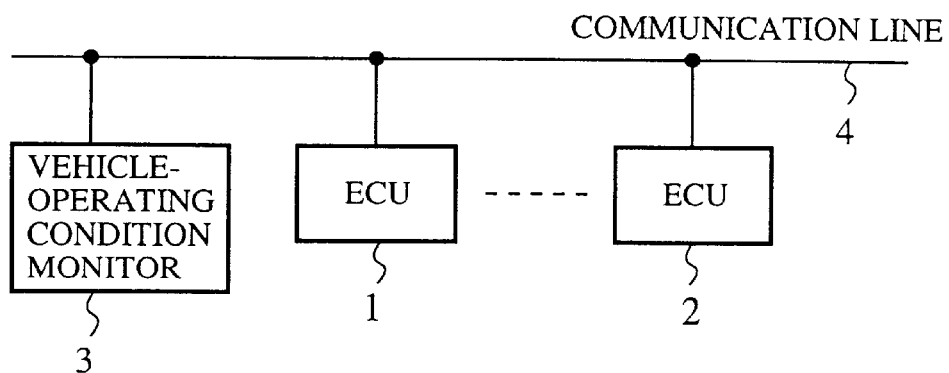
FIG. 1 is a block diagram showing a prior art vehicle monitor.
Figure 2:
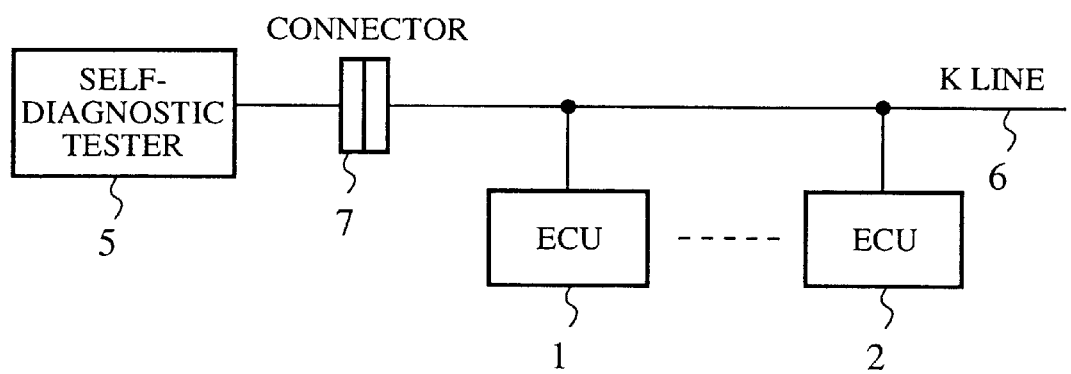
FIG. 2 is block diagram showing connections between a self-diagnostic tester and ECUs.
Figure 3:
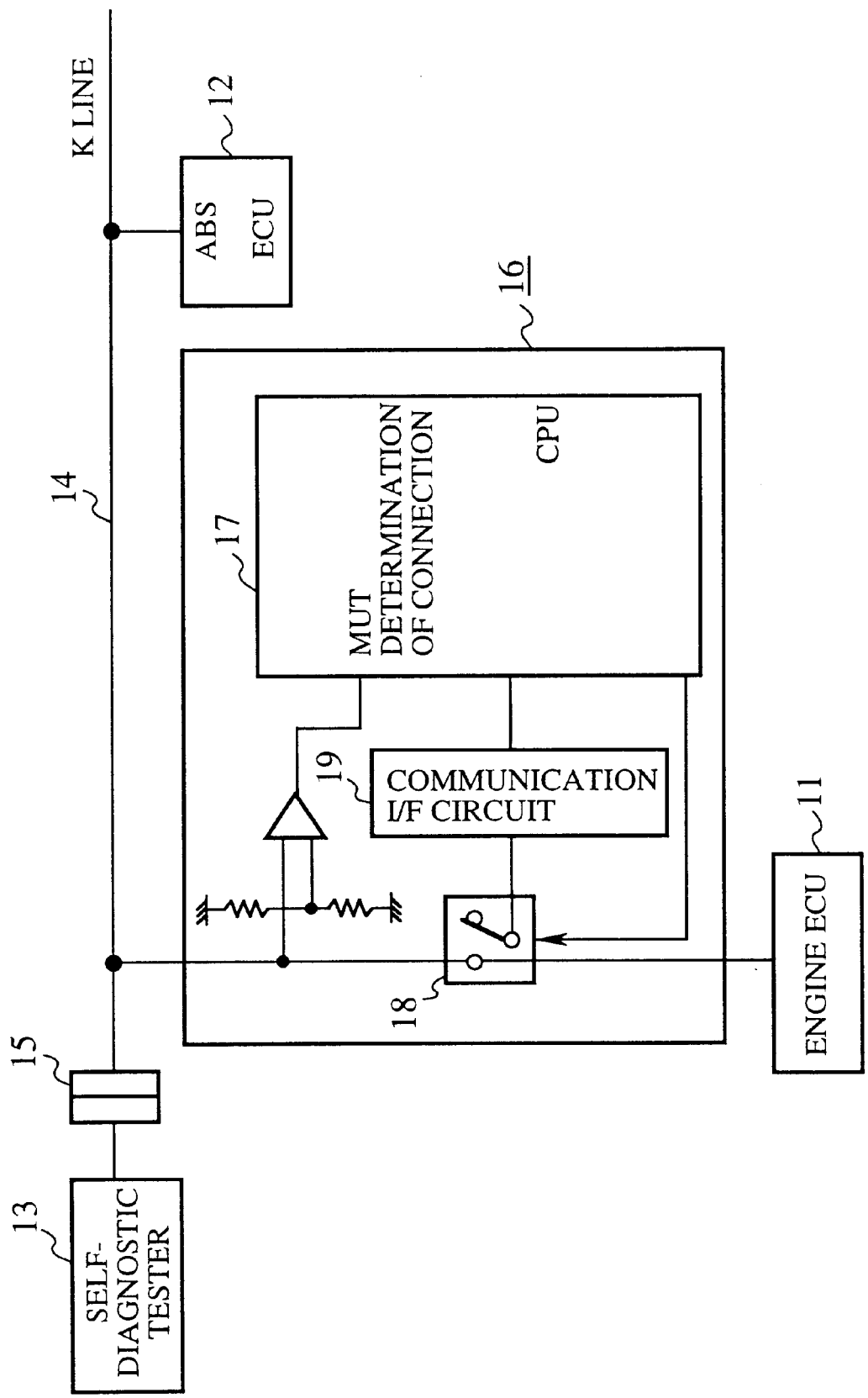
FIG. 3 is a block diagram showing a vehicle monitor according to a first embodiment of the invention.

FIG. 3 is a block diagram showing a vehicle monitor according to a first embodiment of the invention. Referring to the drawing, reference numeral 11 denotes an engine ECU (collection means) for controlling the engine of a vehicle and measuring data indicating vehicle-operating conditions (such as fuel consumption, engine speed and the like), 12 denotes an ABS ECU (collection means) for controlling the ABS apparatus and measuring data indicating vehicle-operating conditions, and 13 denotes a self-diagnostic tester which is connected to a connector 15 when the vehicle is inspected. The self-diagnostic tester 13 has a function of detecting an abnormality or the like in the vehicle upon receipt of data from the engine ECU 11 and the ABS ECU 12.

Further, reference numeral 14 denotes a K line used as a communication line, 15 denotes a connector (connection means) allowing the self-diagnostic tester 13 to connect to the K line 14, 16 denotes an operation monitor obtaining data indicating vehicle-operating conditions from the K line 14, when the self-diagnostic tester 13 is not connected with the K line 14, and displaying the data on an indicator, 17 denotes a CPU (determination means, display means) determining whether or not the self-diagnostic tester 13 is connected with the K line 14 and changing the path to which a switch 18 is to be connected according to the result of the determination and, on the other hand, displaying received data indicating vehicle-operating conditions from the K line 14 on the indicator, 18 denotes a switch (determination means) in the operation monitor 16, and 19 denotes a communication I/F circuit in the operation monitor 16.

Further, FIG. 5 is a flowchart showing the vehicle monitor method according to the first embodiment of the invention.

The operation of the present invention will be described below.

Firstly, the engine ECU 11 and the ABS ECU 12 control the engine, the ABS apparatus, and the like to realize operating conditions corresponding to accelerating and braking operations. At the same time, they measure fuel consumption, engine speed and the like for the purpose of providing the driver with data indicating engine conditions, the ABS condition and so on (Step ST1).

On the other hand, since the self-diagnostic tester 13 is for the use of a mechanic or similar workman in diagnosing vehicle-operating conditions when the vehicle is inspected for detecting an abnormality or the like, it is not normally connected with the connector 15 during day to day use. However, when it is connected with the connector 15, it can obtain data indicating engine condition by transmitting data transfer requests to the engine ECU 11 and the ABS ECU 12 through the K line 14 and receiving such data in the reverse manner.

Thereby, the self-diagnostic tester 13 can diagnose the vehicle-operating conditions according to such data. However, as described above, since the self-diagnostic tester 13 detects abnormalities in the vehicle when the vehicle is inspected and is not used when the vehicle is normally operated, it is not connected with the connector 15 during normal operation. Hence during normal use, there arises no problem even if the K line 14 is used by an apparatus other than the self-diagnostic tester 13, i.e., by the operation monitor 16.

Therefore, in the first embodiment, in order that the operation monitor 16 may obtain data indicating condition of the engine, the ABS apparatus, and the like from the engine ECU 11 and the ABS ECU 12 without a designated communication line, the operation monitor 16 is connected with the K line 14 only when the self-diagnostic tester 13 is unconnected.

More precisely, the CPU 17 of the operation monitor 16 detects the potential on the K line 14 (Step ST2) and, when the potential is higher than a reference potential, the self-diagnostic tester 13 is determined to be connected and, when the potential is lower than the reference potential, the self-diagnostic tester 13 is determined to be unconnected (Step ST3).

Figure 4:
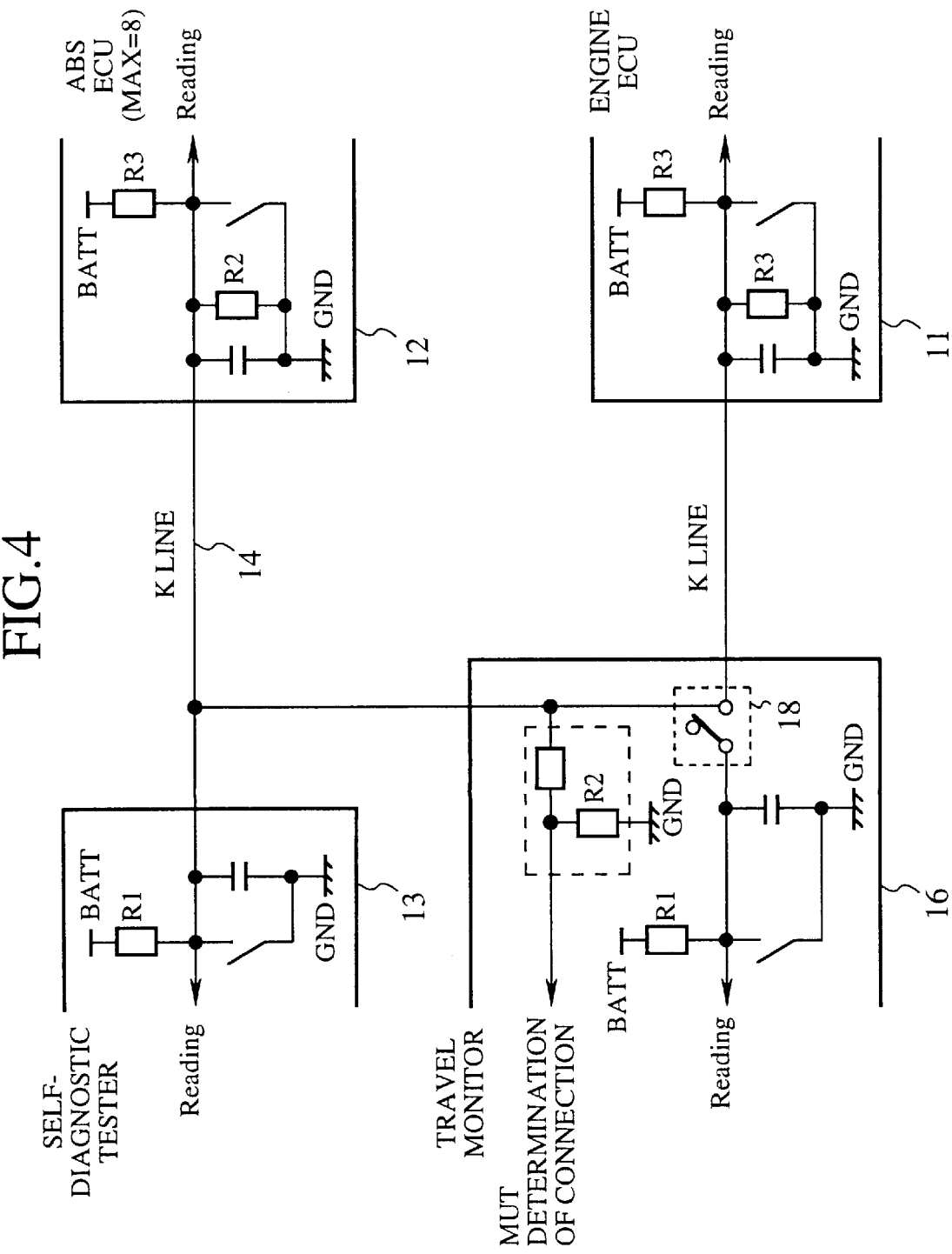
FIG. 4 is a circuit diagram explaining the potential on a K line.

Here, as shown in FIG. 4, the potential on the K line 14 is dependent on the combined resistance value between the K line 14 and the power source BATT and the combined resistance value between the K line 14 and GND. Each of the combined resistance values is determined by a component in the self-diagnostic tester 13 such as a pull-up resistor R3 or the engine ECU 11, or similar component.

However, when the path to which the switch 18 is connected is changed, the circuit configuration is changed which thus causes the combined resistance values to be varied. Hence, when the connected path of the switch 18 is changed, the potential on the K line 14 is changed even if the connected state of the self-diagnostic tester 13 is kept unchanged.

Therefore, in cases when the setting of the reference potential is not suitable, for example, when the operation monitor 16 is in its unconnected state, it is possible to accurately determine whether the self-diagnostic tester 13 is connected or not. However when the operation monitor 16 is connected, the possibility arises such a determination cannot be accurately performed.

Accordingly, the reference potential must be set to a value, which not only takes into account the resistance value of the pull-up resistor R3, the power source voltage BATT, and the like but which also enables the accurate determination as to whether or not the self-diagnostic tester 13 is connected, regardless of whether the operation monitor 16 is connected or not.

However, the comparison of the potential on the K line 14 with the reference potential by the CPU 17 of the operation monitor 16 may be used to recognize the path to which the switch 18 is connected and make the comparison by using the reference potential that corresponds to the connected path.

When the self-diagnostic tester 13 has been determined to be in connection, the CPU 17 of the operation monitor 16 controls the switch 18 so that the operation monitor 16 may be disconnected from the K line 14. This is because if the operation monitor 16 is in connection with the K line 14, there arises the possibility that processing of the self-diagnostic tester 13 will be disturbed (Step ST7).

On the other hand, when the self-diagnostic tester 13 has been determined not to be in connection, the CPU 17 controls the switch 18 so that the operation monitor 16 is connected to the K line 14 in order that the operation monitor 16 may obtain data indicating vehicle-operating conditions (Step ST4).

When the operation monitor 16 is connected to the K line 14, the operation monitor 16 transmits data transfer requests indicating vehicle-operating conditions to the engine ECU 11 and the ABS ECU 12 through the K line 14.

When data are transmitted thereto from the engine ECU 11 and the ABS ECU 12 in compliance with the requests for transfer through the K line 14 (Step ST5), the operation monitor 16 obtains the data from the K line 14 and displays the data for example, on an indicator in the vehicle (Step ST6).

Further, vehicle-operating conditions may be diagnosed on the basis of the data and the results of the diagnosis may be presented.

For example, when the engine temperature exceeds a reference level, the result of diagnosis indicative of an abnormality present in the engine cooling system may be displayed.

As is apparent from the above, the first embodiment allows for a determination to be made as to whether or not the self-diagnostic tester 13 is connected with the K line 14 and, when the result of the determination shows that the self-diagnostic tester 13 is not in connection with the K line 14, data indicating vehicle-operating conditions are obtained from the engine ECU 11 or the like through the K line 14. Therefore, the effect is obtained that data indicating vehicle-operating conditions can be obtained using the K line 14, when the self-diagnostic tester 13 is not in connection, without the need for a designated communication line.

INDUSTRIAL APPLICABILITY

As described above, the vehicle monitor, as well as the vehicle monitor method, of the present invention is suited for use in a vehicle in which it is difficult to provide a designated communication line, when mounting thereon an operation monitor 16 for displaying data concerning vehicle-operating conditions.

What is claimed is:

1. A vehicle monitor comprising:
   a single communication line;
   a connection means for allowing a self-diagnostic tester to connect with said communication line;
   a collection means for collecting data indicating vehicle-operating conditions and for outputting the data to said communication line;
   a determination means for determining whether or not said self-diagnostic tester is in connection with said communication line, by comparing a potential on said communication line with a reference potential; and
   a display means for obtaining data indicating vehicle-operating conditions from said communication line and displaying the data, when the result of the determination made by said determination means indicates that there is no connection made.

2. A vehicle monitor according to claim 1, wherein a K line is used as a communication line.

3. A vehicle monitor according to claim 1, wherein said determination means disconnects said display means from said communication line when said self-diagnostic tester is in connection with said communication line, and when said self-diagnostic tester is not in connection, connects said presentation means to said communication line.

4. A vehicle monitor according to claim 1, wherein said presentation means diagnoses vehicle-operating conditions on the basis of data indicating vehicle-operating conditions and displays the results of the diagnosis.

5. A vehicle monitor method comprising the steps of:
   collecting data indicating operating conditions of a vehicle;
   outputting the data to a single communication line;
   determining whether or not a self-diagnostic tester is in connection with said communication line, by comparing a potential on said communication line with a reference potential; and
   obtaining data indicating vehicle-operating conditions from said communication line and displaying the data when the result of the determination indicates that said self-diagnostic tester is not in connection with said communication line.

6. A vehicle monitor method according to claim 5, wherein a K line is used as said communication line.

7. A vehicle monitor method according to claim 5, wherein an operation monitor displaying data is disconnected from the communication line when said self-diagnostic tester is in connection with said communication line, and conversely, when said self-diagnostic tester is not in connection, said operation monitor is put into connection with said communication line.

8. A vehicle monitor method according to claim 5, wherein vehicle-operating conditions are diagnosed on the basis of data indicating such conditions and the results of the diagnosis are displayed.

* * * * *

UNITED STATES PATENT AND TRADEMARK OFFICE
CERTIFICATE OF CORRECTION

PATENT NO. : 6,407,664 B1  
DATED : June 18, 2002  
INVENTOR(S) : Takashi Sadahiro et al.

It is certified that error appears in the above-identified patent and that said Letters Patent is hereby corrected as shown below:

<u>Title page, Item [54] and Column 1, lines 1 and 2,</u>  
Should read -- VEHICLE MONITOR AND METHOD THEREOF --

<u>Title page,</u>  
Item [73], should read -- Mitsubishi Denki Kabushiki Kaisha, Tokyo (JP) --

Signed and Sealed this

Fifth Day of August, 2003

JAMES E. ROGAN  
*Director of the United States Patent and Trademark Office*